US011955077B2

(12) United States Patent
Jeon et al.

(10) Patent No.: US 11,955,077 B2
(45) Date of Patent: Apr. 9, 2024

(54) ELECTRONIC DEVICE COMPRISING DISPLAY, AND METHOD FOR DRIVING DISPLAY

(71) Applicant: SAMSUNG ELECTRONICS CO., LTD., Suwon-si (KR)

(72) Inventors: Namhyeon Jeon, Suwon-si (KR); Jitae Kim, Suwon-si (KR); Sungwon Ryu, Suwon-si (KR); Hyunchang Shin, Suwon-si (KR); Gyudong Eom, Suwon-si (KR); Youngman Lee, Suwon-si (KR); Jihan Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/858,470

(22) Filed: Jul. 6, 2022

(65) Prior Publication Data

US 2022/0343848 A1 Oct. 27, 2022

Related U.S. Application Data

(63) Continuation of application No. PCT/KR2020/018861, filed on Dec. 22, 2020.

(30) Foreign Application Priority Data

Jan. 22, 2020 (KR) ........................ 10-2020-0008614

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01);
(Continued)

(58) Field of Classification Search
CPC ... G09G 2300/0819; G09G 2300/0842; G09G 2300/0861; G09G 2310/0251;
(Continued)

(56) References Cited

U.S. PATENT DOCUMENTS

| | | |
|---|---|---|
| 9,208,727 B2 | 12/2015 | Lee et al. |
| 9,823,729 B2 | 11/2017 | An et al. |

(Continued)

FOREIGN PATENT DOCUMENTS

| | | |
|---|---|---|
| KR | 10-2014-0134046 | 11/2014 |
| KR | 2016-0052942 | 5/2016 |

(Continued)

OTHER PUBLICATIONS

International Search Report for PCT/KR2020/018861, dated Apr. 15, 2021, 3 pages.

(Continued)

*Primary Examiner* — Hong Zhou
(74) *Attorney, Agent, or Firm* — NIXON & VANDERHYE P.C.

(57) ABSTRACT

An electronic device may include: a housing; a display which is viewed through at least a portion of the housing and which displays a screen image by using a plurality of pixels; a display driving circuit for providing, to the display, a data voltage an emission signal for driving each of the plurality of pixels; and a processor operationally connected to the display and the display driving circuit. The processor can be configured to set a first frame driven by the display, and the display driving circuit can be configured to set a first period in which the data voltage is supplied to a first transistor in each of the plurality of pixels and a second period in which the data voltage written in the first period is maintained and to change the initialization voltage to be supplied to the plurality of pixels in the second period. Various other
(Continued)

embodiments identified from the specification are also possible.

14 Claims, 12 Drawing Sheets

(52) U.S. Cl.
CPC . *G09G 2310/08* (2013.01); *G09G 2320/0233* (2013.01); *G09G 2320/0247* (2013.01); *G09G 2330/021* (2013.01)

(58) Field of Classification Search
CPC ....... G09G 2310/0262; G09G 2310/08; G09G 2320/0233; G09G 2320/0247; G09G 2330/021; G09G 3/3233
See application file for complete search history.

(56) References Cited

U.S. PATENT DOCUMENTS

| | | | | |
|---|---|---|---|---|
| 9,898,963 | B2 | 2/2018 | Lee et al. | |
| 10,311,793 | B2 | 6/2019 | Chai et al. | |
| 10,515,584 | B2 | 12/2019 | Cho et al. | |
| 10,551,903 | B2 | 2/2020 | An et al. | |
| 10,586,496 | B2 | 3/2020 | Kim et al. | |
| 10,733,938 | B2 | 8/2020 | Chai et al. | |
| 10,810,934 | B2 | 10/2020 | Pyo et al. | |
| 11,164,525 | B2 | 11/2021 | Chai et al. | |
| 11,398,187 | B2 | 7/2022 | Ueno | |
| 2016/0124491 | A1* | 5/2016 | An | G06F 1/3265 713/323 |
| 2017/0061875 | A1* | 3/2017 | Cho | G09G 3/3233 |
| 2017/0116922 | A1* | 4/2017 | Jung | G09G 3/3258 |
| 2017/0337872 | A1* | 11/2017 | Chai | G09G 3/3258 |
| 2018/0293944 | A1 | 10/2018 | Kim et al. | |
| 2019/0057650 | A1* | 2/2019 | Choi | G09G 3/3233 |
| 2019/0130832 | A1* | 5/2019 | Chang | G09G 3/3258 |
| 2019/0266941 | A1 | 8/2019 | Pyo et al. | |
| 2019/0340977 | A1* | 11/2019 | Park | G06F 1/3265 713/323 |
| 2021/0005139 | A1* | 1/2021 | Ueno | G09G 3/3291 |
| 2023/0230546 | A1 | 7/2023 | Chai et al. | |

FOREIGN PATENT DOCUMENTS

| | | |
|---|---|---|
| KR | 10-2017-0026762 | 3/2017 |
| KR | 2017-0130681 | 11/2017 |
| KR | 10-2018-0075054 | 7/2018 |
| KR | 10-2018-0114567 | 10/2018 |
| KR | 10-2019-0034729 | 4/2019 |
| KR | 10-2019-0122056 | 10/2019 |
| WO | 2019/186765 | 10/2019 |

OTHER PUBLICATIONS

Written Opinion of the ISA for PCT/KR2020/018861, dated Apr. 15, 2021, 4 pages.
Office Action for KR Application No. 10-2020-0008614 dated Oct. 16, 2023 and English translation, 22 pages.

* cited by examiner

ELECTRONIC DEVICE COMPRISING DISPLAY, AND METHOD FOR DRIVING DISPLAY

CROSS-REFERENCE TO RELATED APPLICATIONS

This application is a continuation of International Application No. PCT/KR2020/018861 designating the United States, filed on Dec. 22, 2020, in the Korean Intellectual Property Receiving Office and claiming priority to Korean Patent Application No. 10-2020-0008614, filed on Jan. 22, 2020, the disclosures of which are incorporated by reference herein in their entireties.

BACKGROUND

Field

Various example embodiments relate to an electronic device including a display and/or a method for driving the display.

Description of Related Art

An electronic device may display an image through a display disposed on a surface of a housing. A plurality of pixels for displaying an image may be disposed in the display. The display may be supplied with signals and/or voltages for displaying an image from a display driver integrated circuit (DDI) (hereinafter also referred to as a "display driving circuit"). The plurality of pixels may be supplied with a data voltage corresponding to the brightness and/or the color of an image to be displayed through a frame from the display driving circuit. In each pixel, a driving transistor may be driven based on the data voltage supplied from the display driving circuit. When the driving transistor is driven, a light-emitting element such as an organic light-emitting diode (OLED) may emit a light with specified luminance. In detail, the data voltage may be supplied to a source electrode of the driving transistor, and the luminance of the light-emitting element that is driven by the driving transistor may be determined by a voltage difference value of the source electrode of the driving transistor and a gate electrode of the driving transistor.

Meanwhile, a driving frequency of the display driving circuit may change depending on a situation. For example, when the display displays a screen changing as much as a specified variation or less or displays an always on display (AOD), the display driving circuit may decrease the driving frequency to a specified frequency or less so as to be driven at a low frequency. When the display driving circuit is driven at a low frequency, power consumption of the electronic device may decrease.

When the display driving circuit performs specified driving (e.g., at a low frequency), a leakage current may occur in a transistor (e.g., a driving transistor) of at least one pixel of the display or in transistors (e.g., driving transistors) of two or more pixels of the display. For example, when the leakage current occurs in the transistor of the at least one pixel or in the transistors of the two or more pixels, the luminance of the display may change. When the luminance changes as much as a specified variation or more, the user may perceive a flicker of a screen that is displayed in the display.

SUMMARY

Various example embodiments of the disclosure are directed to provide a method for reducing a flicker phenomenon of a screen displayed in a display when a display driving circuit performs specified driving (e.g., at a low frequency), and an electronic device to which the method is applied. Also, various embodiments may provide, for example, a method for driving a display in an electronic device and the electronic device.

According to an example embodiment of the disclosure, an electronic device may include a housing, a display that is viewable and displays a screen via a plurality of pixels, a display driving circuit that provides the display with a data voltage and an emission signal for driving each of the plurality of pixels, and a processor that is operatively connected with the display and the display driving circuit. The processor may set a first frame that the display drives. The display driving circuit may set a first period in which the data voltage is supplied to a first transistor of each of the plurality of pixels and a second period in which the data voltage written in the first period is maintained and may change an initialization voltage to be supplied to the plurality of pixels in the second period.

According to an example embodiment of the disclosure, an electronic device may include a housing, a display that is viewable through at least a portion of the housing and displays a screen by using a plurality of pixels, a display driving circuit that provides the display with a data voltage and an emission signal for driving each of the plurality of pixels, and a processor that is operatively connected with the display and the display driving circuit. The processor may set a frame that the display drives. The display driving circuit may set a first period in which the data voltage is supplied to a first transistor of each of the plurality of pixels and a second period in which the data voltage written in the first period is maintained and may control a time during which the emission signal is provided in the second period.

According to an example embodiment of the disclosure, a method for driving a display of an electronic device may include setting a first frame that the display drives, setting a first period in which a data voltage for driving a plurality of pixels constituting the display is supplied to a first transistor corresponding to the plurality of pixels and a second period in which the data voltage written in the first period is maintained, and changing an initialization voltage to be supplied to the plurality of pixels in the second period of the first frame.

According to certain example embodiments of the disclosure, when a display driving circuit performs specified (e.g., low-frequency) driving, the display driving circuit may compensate for a luminance difference in a first period (e.g., an address period) and/or a second period (e.g., a holding period) to control (e.g., decrease) a change in a screen (e.g., a flicker phenomenon).

Besides, a variety of effects directly or indirectly understood through this disclosure may be provided.

BRIEF DESCRIPTION OF THE DRAWINGS

The above and other aspects, features and advantages of certain embodiments of the present disclosure will be more apparent from the following detailed description, taken in conjunction with the accompanying drawings, in which.

With regard to description of drawings, the same or similar components will be marked by the same or similar reference signs.

DETAILED DESCRIPTION

Hereinafter, various example embodiments of the disclosure may be described with reference to accompanying drawings. However, those of ordinary skill in the art will recognize that modification, equivalent, and/or alternative on various embodiments described herein can be variously made without departing from the scope and spirit of the disclosure.

Figure 1:
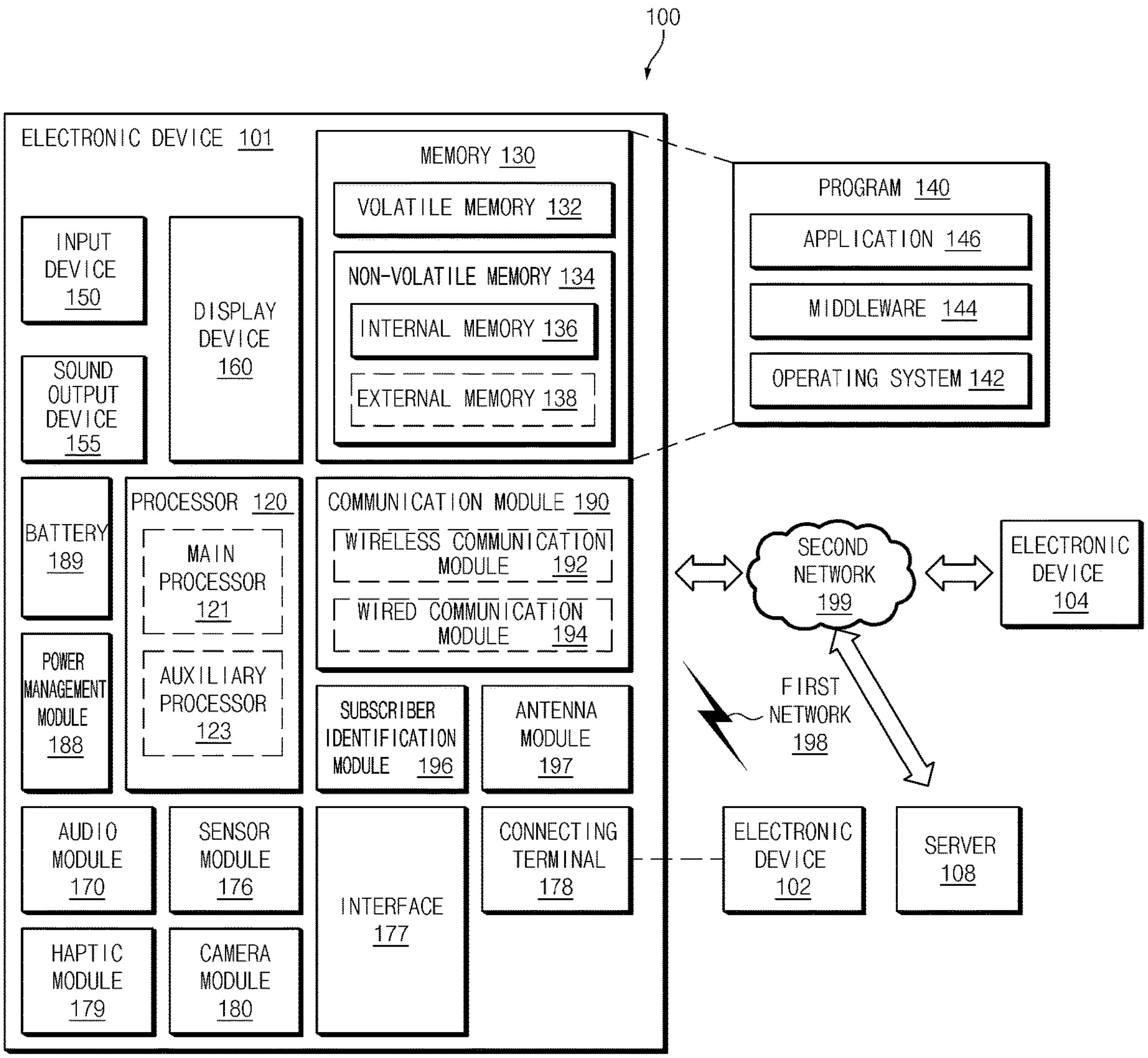
FIG. 1 is a block diagram illustrating an electronic device in a network environment according to various example embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., PCB). According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
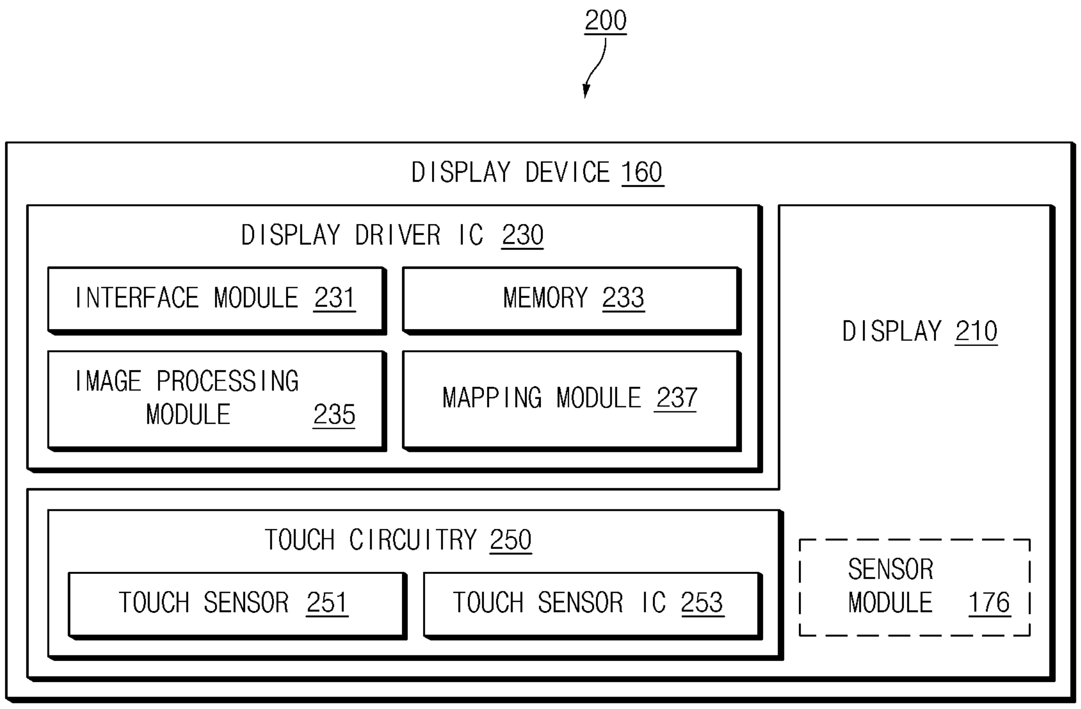
FIG. 2 is a block diagram illustrating the display device according to various example embodiments.

FIG. 2 is a block diagram 200 illustrating the display device 160 according to various embodiments. Referring to FIG. 2, the display device 160 may include a display 210 and a display driver integrated circuit (DDI) 230 to control the display 210. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 150 or the sensor module 176 via the interface module 231. The DDI 230 may also store at least part of the received image information in the memory 233, for example, on a frame by frame basis.

The image processing module 235 may perform pre-processing or post-processing (e.g., adjustment of resolution, brightness, or size) with respect to at least part of the image data. According to an embodiment, the pre-processing or post-processing may be performed, for example, based at least in part on one or more characteristics of the image data or one or more characteristics of the display 210.

The mapping module 237 may generate a voltage value or a current value corresponding to the image data pre-processed or post-processed by the image processing module 235. According to an embodiment, the generating of the voltage value or current value may be performed, for example, based at least in part on one or more attributes of the pixels (e.g., an array, such as an RGB stripe or a pentile structure, of the pixels, or the size of each subpixel). At least some pixels of the display 210 may be driven, for example, based at least in part on the voltage value or the current value such that visual information (e.g., a text, an image, or an icon) corresponding to the image data may be displayed via the display 210.

According to an embodiment, the display device 160 may further include the touch circuitry 250. The touch circuitry 250 may include a touch sensor 251 and a touch sensor IC 253 to control the touch sensor 251. The touch sensor IC 253 may control the touch sensor 251 to sense a touch input or a hovering input with respect to a certain position on the display 210. To achieve this, for example, the touch sensor 251 may detect (e.g., measure) a change in a signal (e.g., a voltage, a quantity of light, a resistance, or a quantity of one or more electric charges) corresponding to the certain position on the display 210. The touch circuitry 250 may provide input information (e.g., a position, an area, a pressure, or a time) indicative of the touch input or the hovering input detected via the touch sensor 251 to the processor 120. According to an embodiment, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 150)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment, the touch sensor 251 or the sensor module 176 may be disposed between pixels in a pixel layer of the display 210, or over or under the pixel layer.

Figure 3:
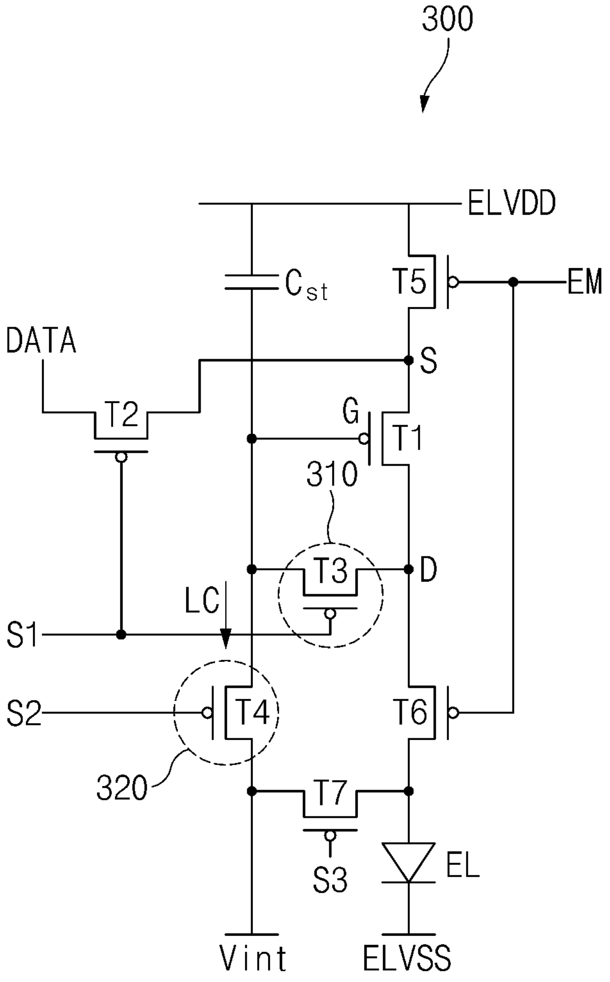
FIG. 3 is a circuit diagram illustrating a pixel of a display according to a comparative example.

FIG. 3 is a circuit diagram 300 illustrating a pixel of a display (e.g., the display 210 of FIG. 2) according to a comparative example. A pixel may include, for example, a light-emitting element EL, a storage capacitor Cst, and first to seventh transistors T1, T2, T3, T4, T5, T6, and T7.

The light-emitting element EL may emit a light with luminance that is determined depending on a voltage between opposite ends thereof, for example, an anode and a cathode. The light-emitting element EL may be, for example, an organic light-emitting diode (OLED). Also, the light-emitting element EL may be connected with a low-potential driving voltage ELVSS, for example. The low-potential driving voltage ELVSS may be, for example, a negative voltage or a ground voltage GND.

According to an embodiment, a voltage of a gate electrode "G" of the first transistor T1 may be uniformly maintained by the storage capacitor Cst. A source electrode "S" of the first transistor T1 may be supplied with a data voltage DATA under control of the second transistor T2. The first transistor T1 may output a driving current for driving the light-emitting element EL to a drain electrode "D" thereof depending on the data voltage DATA and the voltage of the gate electrode "G" thereof. The first transistor T1 may be a driving transistor of the pixel. The first transistor T1 may be a positive-type or negative type thin film transistor (TFT).

According to an embodiment, the second transistor T2 may supply the data voltage DATA to the storage capacitor Cst through the first transistor T1 based on a first scan signal S1. According to an embodiment, the third transistor T3 (310) may supply the data voltage DATA to the storage capacitor Cst through the first transistor T1 under control of the first scan signal S1. According to an embodiment, the fourth transistor T4 (320) may initialize the gate voltage of the first transistor T1 to an initialization voltage Vint based on a second scan signal S2 in a second frame (e.g., a frame following a first frame). According to an embodiment, the fifth transistor T5 may supply a high-potential reference voltage ELVDD to the source electrode "S" of the first transistor T1 based on an emission signal EM. According to an embodiment, the sixth transistor T6 may supply the driving current to the light-emitting element EL based on the emission signal EM.

According to an embodiment, the seventh transistor T7 may initialize the opposite ends of the light-emitting element EL based on a third scan signal S3.

According to an embodiment, each of the plurality of pixels may be supplied with the data voltage DATA corresponding to the brightness and/or the color of an image to be displayed in the first frame from the display driving circuit 230. The first transistor T1 that is a driving transistor of each pixel may be driven based on the data voltage DATA supplied from the display driving circuit 230. When the first transistor T1 is driven, the light-emitting element EL such as an organic light-emitting diode may emit a light with specified luminance. In detail, the data voltage DATA may be supplied to the source electrode "S" of the first transistor T1, and the luminance of the light-emitting element EL that the first transistor T1 drives may be determined by a voltage difference value of the source electrode "S" of the first transistor T1 and the gate electrode "G" of the first transistor T1.

According to an embodiment, a gate voltage that is a voltage of the gate electrode "G" of the first transistor T1 may change due to a leakage current LC flowing in the third transistor T3 (310) and/or the fourth transistor T4 (320). The third transistor T3 (310) that is a diode connection transistor connecting the gate electrode "G" and the drain electrode "D" of the first transistor T1 may be turned on, and the fourth transistor T4 (320) that is an initialization transistor selectively connecting the gate electrode "G" of the first transistor T1 and an initialization voltage part (not illustrated) supplying the initialization voltage Vint may be turned on. When one of the third transistor T3 (310) or the fourth transistor T4 (320) is turned on, the leakage current LC may flow from the drain electrode "D" of the first transistor T1 to the initialization voltage part (not illustrated). The third transistor T3 and the fourth transistor T4 may not be turned on at the same time.

Figure 4:
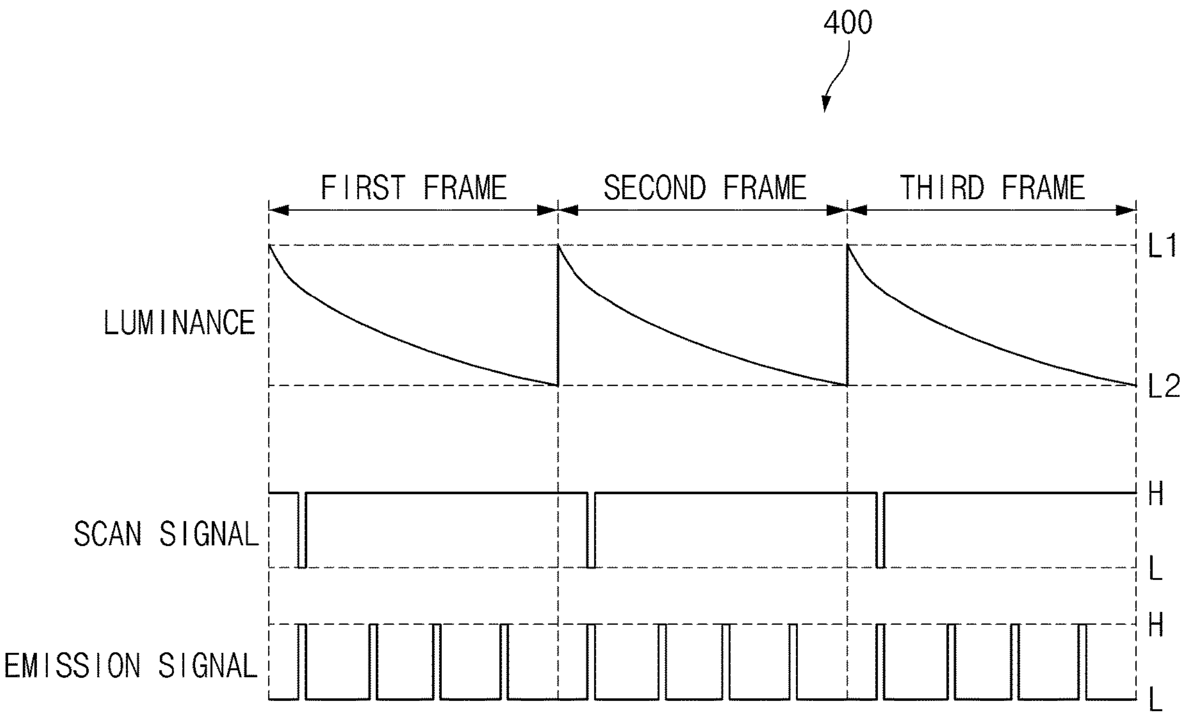
FIG. 4 is a graph illustrating luminance when a display driving circuit according to the comparative example is driven at a low frequency.

FIG. 4 is a graph 400 illustrating luminance when a display driving circuit (e.g., the display driving circuit 230 of FIG. 2) according to the comparative example is driven at a low frequency.

According to an embodiment, the display driving circuit 230 may set a frame by using a scan signal. The display driving circuit 230 may determine a frame (e.g., a first frame, a second frame, or a third frame) based on the transition of the scan signal from High "H" to Low "L". In one frame, an emission signal may transition to a low (L) state as much as the specified number of times (e.g., 4 times). In the low (L) state, a pixel disposed in a display (e.g., the display 210 of FIG. 2) may emit a light.

According to an embodiment, in each frame (e.g., the first frame, the second frame, or the third frame), when the pixel emits a light with brightness different from brightness associated with the data voltage DATA, a luminance change may occur in a screen that is displayed in the display (e.g., the display 210 of FIG. 2). For example, the luminance may change (e.g., decrease) from first luminance L1 to second luminance L2.

According to an embodiment, referring to FIG. 3, when the leakage current LC flows, the gate voltage of the first transistor T1 may change. For example, when the first transistor T1 is a positive-type or negative-type thin film transistor (TFT), due to the leakage current LC, the gate voltage of the first transistor T1 may change to almost a voltage of the initialization voltage part (not illustrated). For example, the voltage of the initialization voltage part may have a value that is out of a magnitude range of the data voltage DATA being the gate voltage of the first transistor T1. As an example, the voltage of the initialization voltage part may be about −3.5 V, and the range of the data voltage DATA is from about 3 V or more to about 6 V or less. In this case, when the leakage current LC occurs, the gate voltage of the driving transistor may increase or decrease due to the leakage current.

According to an embodiment, when the gate voltage of the first transistor T1 changes, a voltage difference value of the source electrode "S" of the first transistor T1 and the gate electrode "G" of the first transistor T1 may change. When the voltage difference value of the source electrode "S" of the first transistor T1 and the gate electrode "G" of the first transistor T1 changes, the driving of the first transistor T1 may change. For example, the brightness of the light-emitting element EL that the first transistor T1 drives may change to brightness different from the brightness that is determined by the supplied data voltage DATA. As such, the pixel may emit a light with brightness different from the brightness determined by the data voltage DATA.

According to an embodiment, when the pixel emits a light with brightness different from the brightness determined by the data voltage DATA, a luminance change may occur in a screen that is displayed in the display (e.g., the display 210 of FIG. 2). For example, as illustrated in FIG. 4, the luminance may gradually decrease in a frame. When the display driving circuit 230 performs low-frequency driving at a specified frequency (e.g., 30 Hz) or less, the variation in luminance in the first frame may increase. When the variation in luminance in the first frame is a specified variation or more, the user that views the display (e.g., the display 210 of FIG. 2) may perceive a change of a screen (e.g., a flicker).

Figure 5:
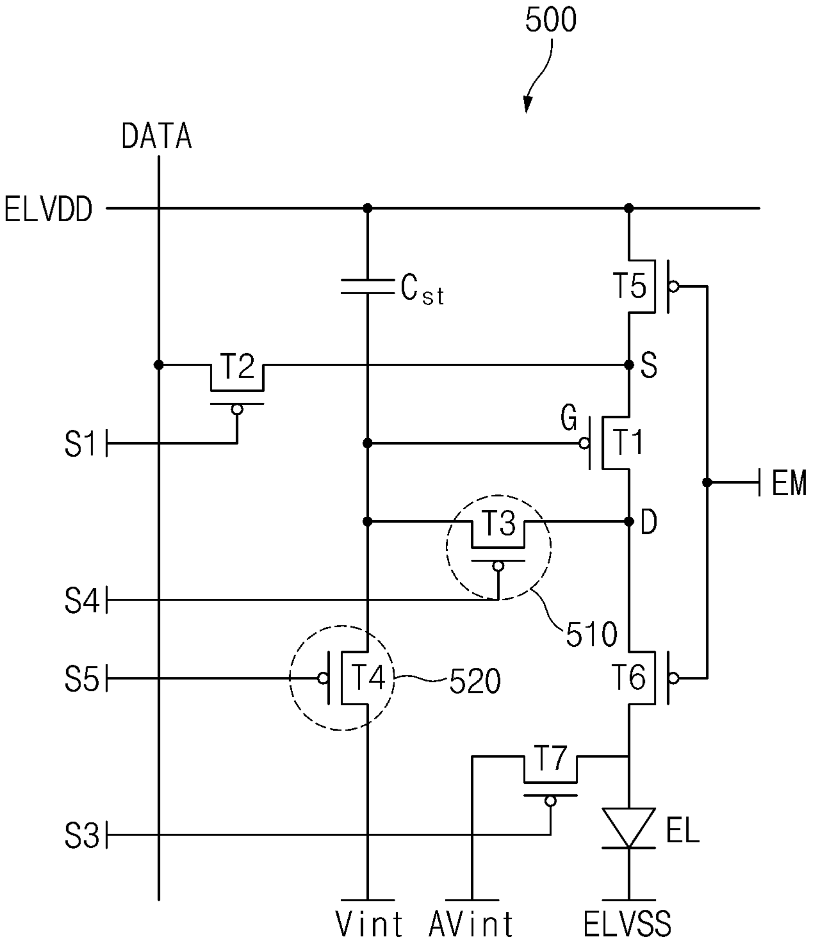
FIG. 5 is a circuit diagram illustrating a pixel of a display according to an example embodiment.

FIG. 5 is a circuit diagram 500 illustrating a pixel of a display (e.g., the display 210 of FIG. 2) according to an example embodiment. A pixel according to an embodiment may include a light-emitting element EL, a storage capacitor Cst, and first to seventh transistors T1, T2, T3, T4, T5, T6, and T7. The light-emitting element EL and the storage capacitor Cst according to an embodiment may be substantially similar or identical to the light-emitting element EL and the storage capacitor Cst according to the comparative example of FIG. 3.

In an example embodiment, a voltage of a gate electrode "G" of the first transistor T1 may be uniformly maintained by the storage capacitor Cst. A source electrode "S" of the first transistor T1 may be supplied with the data voltage DATA under control of the second transistor T2. The first transistor T1 may output a driving current for driving the light-emitting element EL to a drain electrode "D" thereof depending on the data voltage DATA and the voltage of the gate electrode "G" thereof. The first transistor T1 may be a driving transistor of the pixel. For example, the first transistor T1 may be a positive-type metal oxide semiconductor field effect transistor (MOSFET).

In an embodiment, the second transistor T2 may supply the data voltage DATA to the storage capacitor Cst through the first transistor T1 based on a first scan signal S1 in an n-th frame (n being a natural number of 2 or more). The second transistor T2 may determine a first period (e.g., an address period) in which the data voltage DATA are written to the first transistor T1.

In an embodiment, the third transistor T3 may supply the data voltage DATA to the storage capacitor Cst through the first transistor T1 based on a fourth scan signal S4 in the n-th frame. During the n-th frame, the third transistor T3 may maintain the gate voltage of the first transistor T1 in the n-th frame.

In an example embodiment, the fourth transistor T4 may initialize the data voltage DATA stored in the storage capacitor Cst to a first initialization voltage Vint in the n-th frame based on a fifth scan signal S5 in a previous frame (e.g., a (n−1)-th frame).

In an example embodiment, each of the third transistor T3 and the fourth transistor T4 may be oxide thin film transistors (TFTs) 510 and 520. A leakage current of the oxide thin film transistors 510 and 520 may be smaller than a leakage current of a low temperature poly-silicon (LTPS) thin film transistor (TFT). For example, a hybrid oxide poly-silicon (HOP) technology may be applied to the display 210. The leakage current may decrease by applying the hybrid oxide poly-silicon technology to the pixels constituting the display 210.

In an example embodiment, the leakage current may decrease by implementing the third transistor T3 and the fourth transistor T4 with the oxide thin film transistors 510 and 520. The display driving circuit 230 may independently drive the third transistor T3 and the fourth transistor T4 based on the fourth scan signal S4 and the fifth scan signal S5 being independent scan signals.

In an example embodiment, the fifth transistor T5 may supply the high-potential reference voltage ELVDD to the source electrode "S" of the first transistor T1 based on the emission signal EM in the n-th frame. The sixth transistor T6 may supply the driving current to the light-emitting element EL based on the emission signal EM in the n-th frame. The fifth transistor T5 and the sixth transistor T6 may determine a second period (e.g., a holding period) in which a value of the data voltage DATA written in the first period (e.g., an address period) is maintained. For example, in the holding period, the pixel may maintain the potential of the gate electrode "G" of the first transistor T1 in a previous frame (e.g., a (n−1)-th frame) without scanning and may operate only by the emission signal EM; in this case, the holding period may be defined as a self-scan period. When the third transistor T3 and the fourth transistor T4 are implemented with the oxide thin film transistors 510 and 520, the first period (e.g., an address period) in which the data voltage DATA are written to the driving transistor T1 in the n-th frame and/or the second period (e.g., a holding period) in which the data voltage DATA written in a previous frame (e.g., a (n−1)-th frame) are used may be determined for each frame.

In an example embodiment, the seventh transistor T7 may initialize a voltage across the light-emitting element EL to a second initialization voltage AVint based on a third scan signal S3 in a next frame (e.g., a (n+1)-th frame). For example, the second initialization voltage AVint may be variable. The second initialization voltage AVint may be a voltage different in magnitude from the first initialization voltage Vint or may be a voltage identical or similar in magnitude to the first initialization voltage Vint. For example, the second initialization voltage AVint may be a voltage identical or similar in magnitude to the first initialization voltage Vint in the first period (e.g., an address period) and may be a voltage different in magnitude from the first initialization voltage Vint in the second period (e.g., a holding period).

In an example embodiment, the light-emitting element EL may be connected with the low-potential driving voltage ELVSS. The low-potential driving voltage ELVSS may be, for example, a negative voltage or the ground voltage GND.

In an example embodiment, each of the plurality of pixels may be supplied with the data voltage DATA corresponding to the brightness and/or the color to be displayed in a current frame (e.g., an n-th frame) from a display driving circuit (e.g., the display driving circuit 230 of FIG. 2). As the first transistor T1 being a driving transistor of a pixel is driven by the data voltage DATA supplied in the n-th frame, the light-emitting element EL such as an organic light-emitting diode may emit a light with specified luminance. In detail, the data voltage DATA may be supplied to the source electrode "S" of the first transistor T1, and the luminance of the light-emitting element EL that the first transistor T1 drives may be determined by a voltage difference value of the source electrode "S" of the first transistor T1 and the gate electrode "G" of the first transistor T1.

Figure 6:
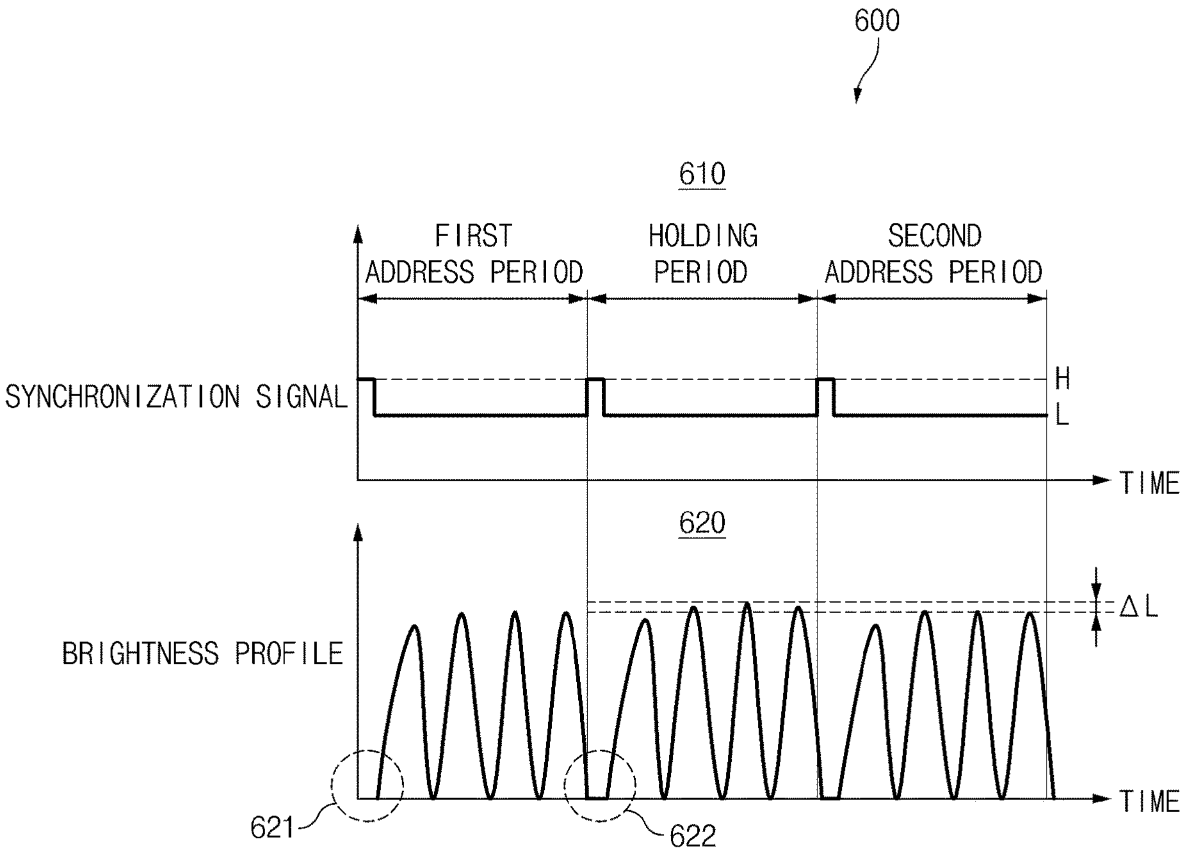
FIG. 6 is a diagram illustrating a synchronization signal, a brightness profile, and a driving current of a first transistor in an address period and a holding period according to a comparative example.
Figure 7:
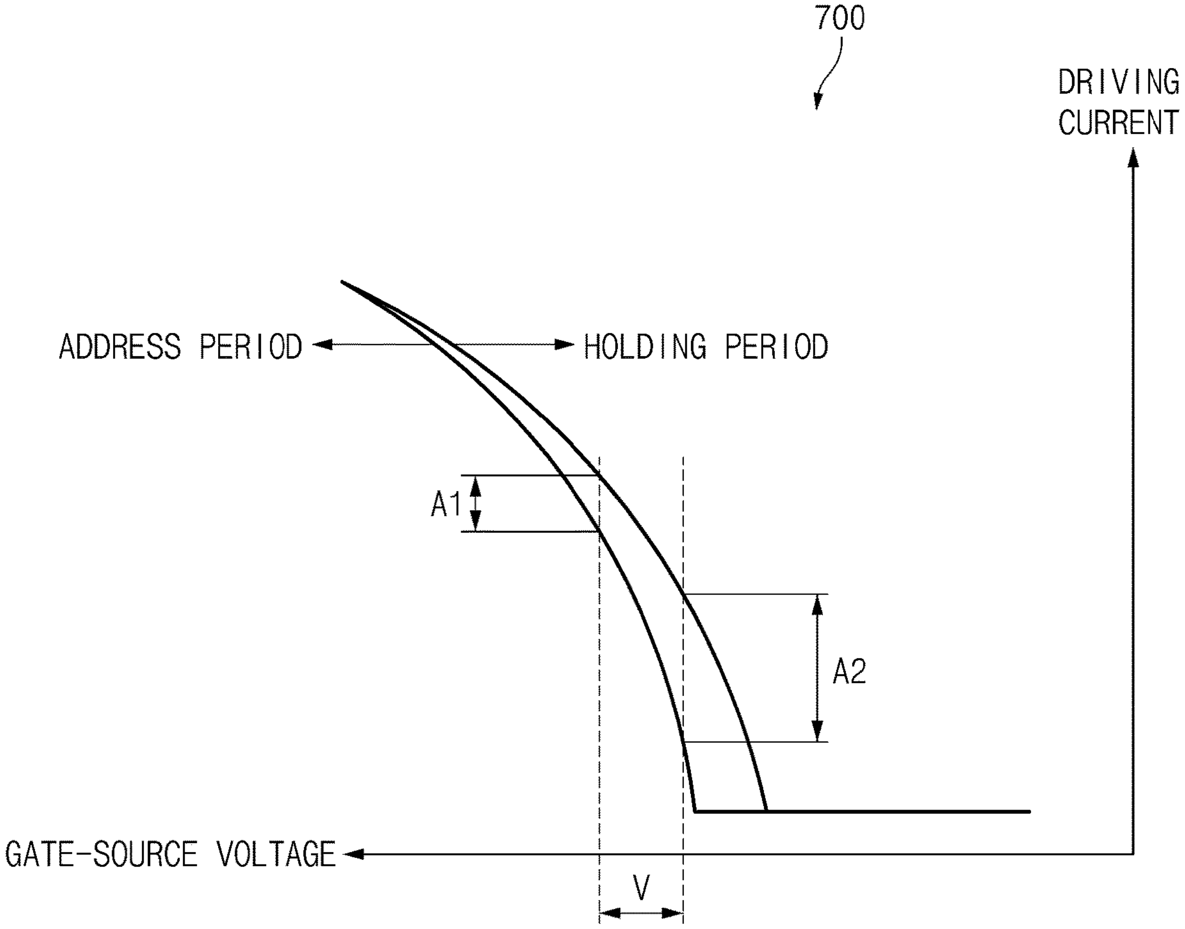
FIG. 7 is a graph illustrating a relationship between a gate-source voltage and a driving current of a driving transistor in an address period and a holding period of the driving transistor of an electronic device according to an example embodiment.
Figure 8:
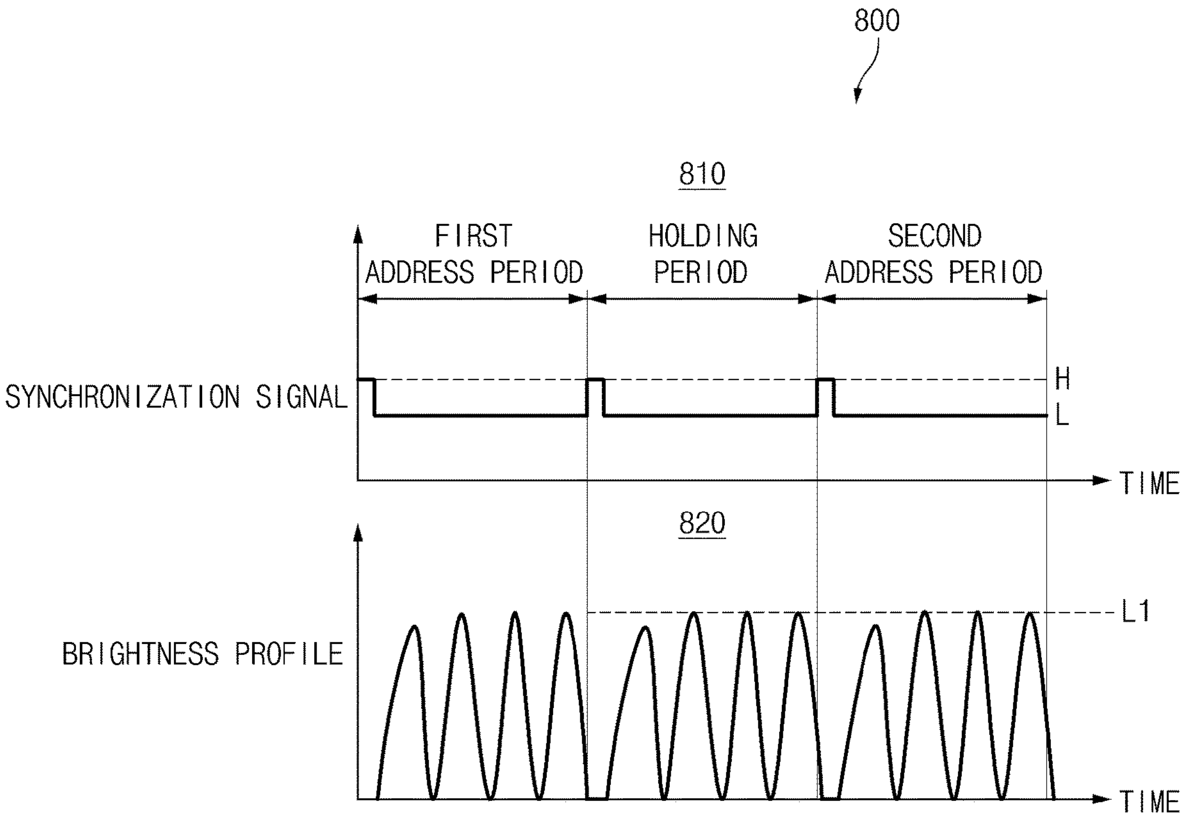
FIG. 8 is a diagram illustrating a synchronization signal, a brightness profile, and a driving current of a driving transistor in an address period and a holding period according to an example embodiment.

FIG. 6 is a diagram 600 illustrating a synchronization signal 610, a brightness profile 620, and a driving current of the first transistor T1 in an address period and a holding period according to a comparative example. FIG. 7 is a graph 700 illustrating a relationship between a gate-source voltage and a driving current of a driving transistor (e.g., the first transistor T1 of FIG. 5) in an address period and a holding period of the driving transistor T1 of an electronic device (e.g., the electronic device 101 of FIG. 1) according to an example embodiment. FIG. 8 is a diagram 800 illustrating a synchronization signal 810, a brightness profile 820, and a driving current of a driving transistor in an address period and a holding period according to an example embodiment. FIGS. 6 and 8 may illustrate the synchronization signals 610 and 810 and/or the brightness profiles 620 and 820 measured in driving at a low frequency such as about 30 Hz.

Referring to the first graph 610, a synchronization signal may determine a start point of each of address periods (e.g., a first address period and a second address period) and a holding period over time. At the start point of each of the address periods and the holding period, the synchronization signal may transition from a low state "L" to a high state "H" or may maintain the high state "H". In the remaining period other than the start point of each of the address periods and the holding period, the synchronization signal may transition from the high state "H" to the low state "L" or may maintain the low state "L" as shown in FIG. 6 for example.

Referring to the second graph 620 in FIG. 6, the data voltage DATA may be written in the first address period and the second address period over time, and thus, a brightness profile corresponding to the data voltage DATA written in a current frame (e.g., an n-th frame) may be obtained. In the holding period, as the data voltage DATA of a previous frame (e.g., a (n−1)-th frame) is maintained in the holding period, a brightness profile corresponding the previous data voltage DATA may be obtained.

The start point of the first address period and/or the second address period may be set to a first point 621. The start point of the holding period may be set to a second point 622.

When the gate-source voltage is equal to or greater than a threshold voltage of a specified magnitude, the driving current "I" flowing through the driving transistor T1 may increase. As the magnitude of the gate-source voltage increases, a high gradation area A1 may be displayed in a display (e.g., the display 210 of FIG. 2). When the magnitude of the gate-source voltage has a difference value with the magnitude of the threshold voltage within a specified value, a low gradation area A2 may be displayed in the display 210.

The driving transistor T1 may be initialized at the start point of the address period. After initialized, the driving transistor T1 may be supplied with new data voltage DATA, a magnitude of the gate-source voltage may be set, and a new gradation area may be displayed.

In a comparative example (e.g., FIG. 6), the brightness profile in the first address period and/or the second address period may be different from the brightness profile in the holding period. For example, after the first transistor T1 being the driving transistor is initialized at the first point 621 being the start point of the first address period and/or the second address period, the driving current corresponding to the data voltage DATA of the n-th frame may flow. As another example, at the second point 622 in the holding period, a current initializing the first transistor T1 being the driving transistor nay not flow, and the driving current "I" corresponding to the data voltage DATA of the (n−1)-th frame may flow. Due to a difference of the hysteresis, a difference corresponding to a specified value ΔL may occur between the brightness profile in the first address period and/or the second address period and the brightness profile in the holding period.

In FIG. 7 according to an example embodiment, when the display driving circuit 230 does not separately perform a control, states of the driving transistor T1 in the address period and the holding period may be different. A driving current of the first transistor T1 may differ between the address period and the holding period. When the driving current difference occurs, a brightness profile value may differ therebetween. For example, the driving current difference in the low gradation area A2 may be greater than the driving current difference in the high gradation area A1. As such, a screen change (e.g., a flicker) may be visually perceived in a low gradation environment such as a dark-room environment.

In an example embodiment, referring to the third graph 810 and the fourth graph 820 in FIG. 8, the display driving circuit (e.g., the display driving circuit 230 of FIG. 2) may compensate for the gate-source voltage by a specified voltage (e.g., a specified voltage "V" of FIG. 7) based on an initialization voltage (e.g., the second initialization voltage AVint of FIG. 5) in the holding period. In the holding period, the display driving circuit 230 may control an emission signal providing period of the driving transistor T1. The display driving circuit 230 may compensate for a brightness profile difference in the holding period through the control and/or the compensation in the holding period and thus may maintain a level of the brightness profile in the address period and the holding period at a specified level L1. The display driving circuit 230 may control (e.g., decrease) a change in a screen displayed in the display 210 when driven at a low frequency.

Figure 9:
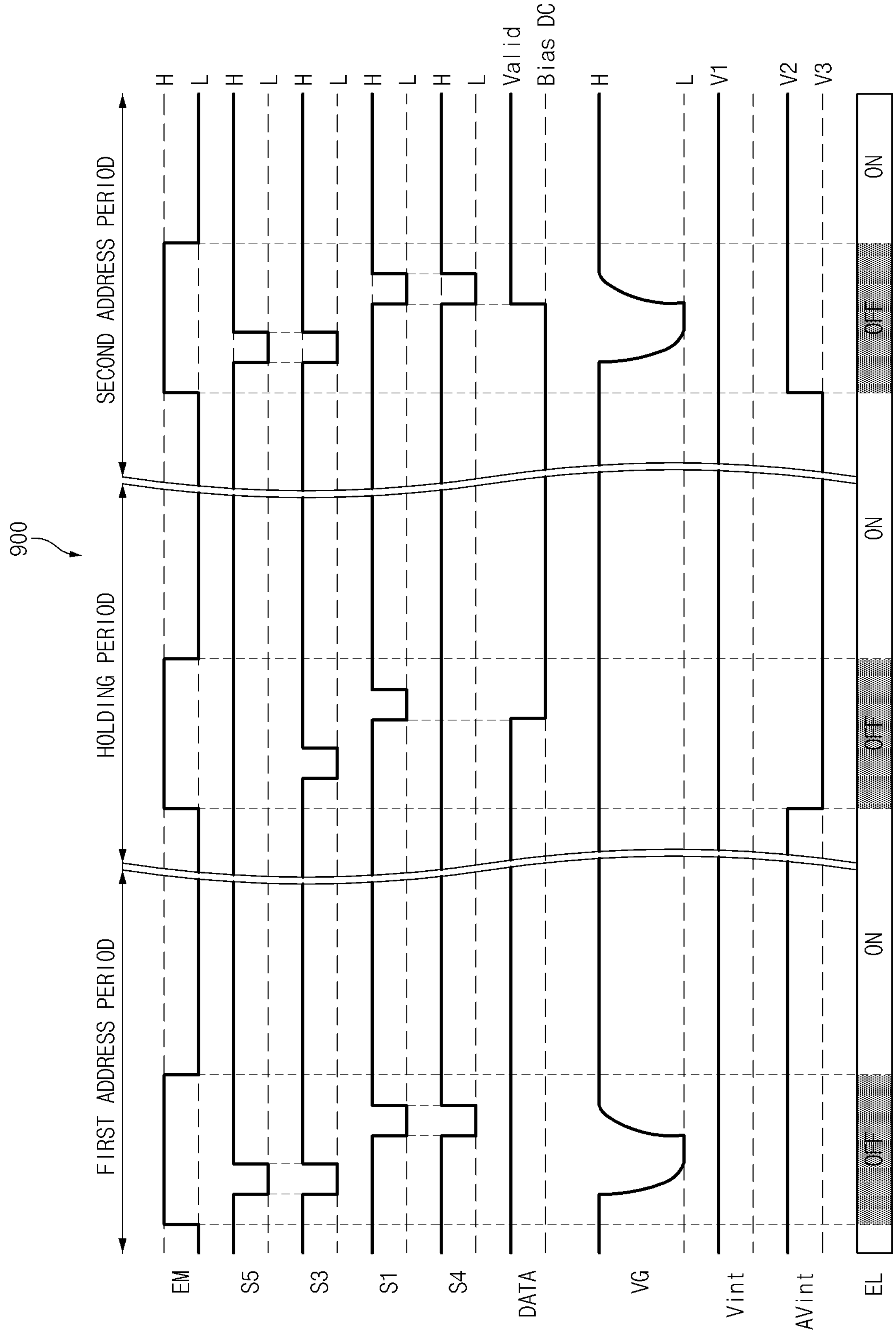
FIG. 9 is a diagram illustrating signals, which a display driving circuit according to an embodiment provides to a pixel of FIG. 5, and/or a driving timing of the pixel of FIG. 5.

FIG. 9 is a diagram 900 illustrating signals, which the display driving circuit 230 according to an example embodiment provides to a pixel of FIG. 5, and/or a driving timing of the pixel of FIG. 5.

For example, a processor (e.g., the processor 120 of FIG. 1) may set a frame. When the emission signal EM is at high "H" in one frame, the light-emitting element EL may be turned off; when the emission signal EM is at low "L" in one frame, the light-emitting element EL may be turned on, and thus, a screen may be displayed.

In an example embodiment, the display driving circuit 230 may set each frame to an address period or a holding period. When driven at a low frequency, the display driving circuit 230 may sequentially set a first address period, a holding period, and a second address period. Each of the first address period and the second address period may be a period where a valid data voltage DATA is supplied to the driving transistor T1. The holding period may be a period where the data voltage DATA is not supplied to the driving transistor T1 and the data voltage DATA of a previous period is maintained such that a light corresponding to the data voltage DATA of the previous period is emitted by the emission signal EM. In the holding period, the data voltage DATA may be in a state of being biased with a DC voltage having a specified magnitude.

In an example embodiment, each of the first address period and the second address period may be a period where a change in a gate voltage VG of the driving transistor T1 is made. The gate voltage VG may change while the emission signal EM is in the high state "H" and the light-emitting element EL is turned off. The holding period may be a period where the gate voltage VG of the driving transistor T1 is maintained.

In an example embodiment, in the first address period and the second address period, the first scan signal S1 for supplying the data voltage DATA, the third scan signal S3 for initializing the light-emitting element EL to the second initialization voltage AVint, the fourth scan signal S4 for maintaining the data voltage DATA of the driving transistor T1, and the fifth scan signal S5 for initializing the light-emitting element EL to the first initialization voltage Vint may transition from the high state "H" to the low state "L". The first scan signal S1 and the fourth scan signal S4 may transition from the high state "H" to the low state "L" at the same/similar timing. The third scan signal S3 and the fifth scan signal S5 may transition from the high state "H" to the low state "L" at the same/similar timing. The timing at which the third scan signal S3 and the fifth scan signal S5 transition from the high state "H" to the low state "L" may be ahead of the timing at which the first scan signal S1 and the fourth scan signal S4 transition from the high state "H" to the low state "L".

In an example embodiment, in the holding period, only the first scan signal S1 and the third scan signal S3 may transition from the high state "H" to the low state "L". In the holding period, the fourth scan signal S4 and the fifth scan signal S5 may maintain the high state "H".

In an example embodiment, the first initialization voltage Vint and the second initialization voltage AVint may be supplied to the plurality of pixels through separate initialization lines. The first initialization voltage Vint may be supplied by a first initialization line (not illustrated) passing through each of pixel columns constituting the plurality of pixels. The second initialization voltage AVint may be supplied by a second initialization line (not illustrated) passing through each of the pixel columns constituting the plurality of pixels.

In an embodiment, a magnitude of the first initialization voltage Vint may be a first voltage V1 in the first address period, the holding period, and the second address period. The first initialization voltage Vint may be maintained at a uniform magnitude regardless of states of periods constituting a frame. For example, the first voltage V1 may be about −3.5 V.

In an example embodiment, a magnitude of the second initialization voltage AVint may be differently set in the address period and the holding period. In the first address period and the second address period, the magnitude of the second initialization voltage AVint may be a second voltage V2. For example, the second voltage V2 may be about −2.5 V. In the holding period, the magnitude of the second initialization voltage AVint may be a third voltage V3. For example, the third voltage V3 may be about −2.6 V.

In an example embodiment, the display driving circuit 230 may adjust the second initialization voltage AVint in the holding period when driven at a low frequency. The display driving circuit 230 may change the second initialization voltage AVint in the holding period so as to cancel out a luminance difference due to a state difference of the driving transistor T1. When a screen that the display 210 displays in the holding period is brighter than a screen that the display 210 displays in the address period, the display driving circuit 230 may decrease a potential of the second initialization voltage AVint. When a screen that the display 210 displays in the holding period is dark, the display driving circuit 230 may increase a potential of the second initialization voltage AVint.

In an example embodiment, the display driving circuit 230 may adjust a magnitude of a reverse voltage formed between the anode and the cathode of the light-emitting element EL by varying the second initialization voltage AVint. A reverse voltage corresponding to a difference value between the second initialization voltage AVint and the low-potential driving voltage ELVSS may be across the light-emitting element EL. The low-potential driving voltage ELVSS may be a negative voltage. When a magnitude of the reverse voltage increases, a magnitude of the driving current may increase.

In an embodiment, when a screen that the display 210 displays in the holding period is brighter than a screen that the display 210 displays in the address period, the display driving circuit 230 may decrease a potential of the second initialization voltage AVint and thus may decrease the reverse voltage corresponding to the difference value between the second initialization voltage AVint and the low-potential driving voltage ELVSS. The display driving circuit 230 may perform a compensation operation for decreasing luminance of the screen that the display 210 displays in the holding period. When a screen that the display 210 displays in the holding period is darker than a screen that the display 210 displays in the address period, the display driving circuit 230 may increase a potential of the second initialization voltage AVint and thus may increase the reverse voltage corresponding to the difference value between the second initialization voltage AVint and the low-potential driving voltage ELVSS. The display driving circuit 230 may perform a compensation operation for increasing a luminance of the screen that the display 210 displays in the holding period.

In an example embodiment, the display driving circuit 230 may allow one or more holding periods to continue after one address period. In the continuous holding period after the address period, the display driving circuit may set a magnitude of the second initialization voltage AVint to a magnitude different from that of the address period. For example, when driven at a low frequency of 10 Hz, the display driving circuit 230 may be driven as shown in Table 1 below.

TABLE 1

| Period | Address | Holding | Holding | Holding | Holding |
|---|---|---|---|---|---|
| AVint | −3.5 V | −3.6 V | −3.6 V | −3.6 V | −3.6 V |

In an example embodiment, the display driving circuit 230 may change the data voltage DATA in the holding period. The display driving circuit 230 may maintain the data voltage DATA in a state of being biased with a DC voltage having a specified magnitude in the holding period. The display driving circuit 230 may correct the hysteresis of the first transistor T1 being a driving transistor by varying the data voltage DATA in the holding period.

Figure 10:
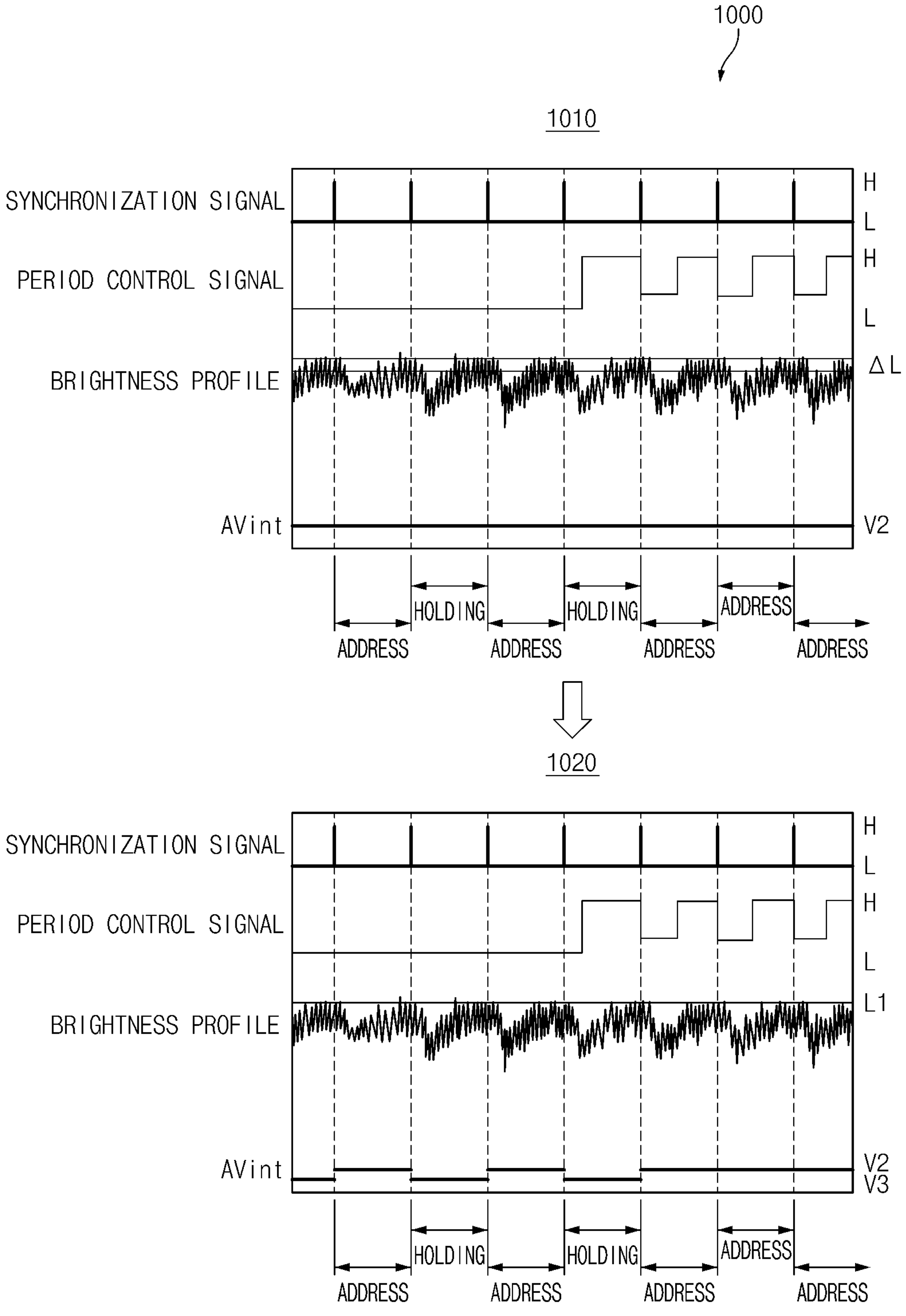
FIG. 10 is a graph illustrating a synchronization signal, a period control signal, a brightness profile, and a second initialization voltage according to a comparative example and an example embodiment.

FIG. 10 is a graph 1000 illustrating a synchronization signal, a period control signal, a brightness profile, and the second initialization voltage AVint according to a comparative example 1010 and an example embodiment 1020.

According to an embodiment, a synchronization signal may transition from the low state "L" to the high state "H" at the start point of the address period or the holding period. The period control signal may determine the address period or the holding period. For example, when the period control signal maintains the low state "L", the low-frequency driving operation in which the address period and the holding period are alternately repeated may be performed. As another example, when the period control signal repeats the low state "L" and the high state "H", the address period may continue such that a new data voltage DATA is written every frame.

In the case of the comparative example 1010, a magnitude of the second initialization voltage AVint may maintain a uniform voltage being the second voltage V2 regardless of a period. A driving characteristic of a driving transistor (e.g., the first transistor T1 of FIG. 2) may change in the address period and the holding period. As such, a change ΔL in the brightness profile may be perceived.

In the case of the example embodiment 1020, a magnitude of the second initialization voltage AVint may maintain the second voltage V2 in the address period and may maintain the third voltage V3 in the holding period. The magnitude of the second initialization voltage AVint may change in the holding period such that a change in the driving characteristic of the driving transistor T1 is compensated for. As such, the brightness profile may maintain a uniform brightness value L1.

Figure 11:
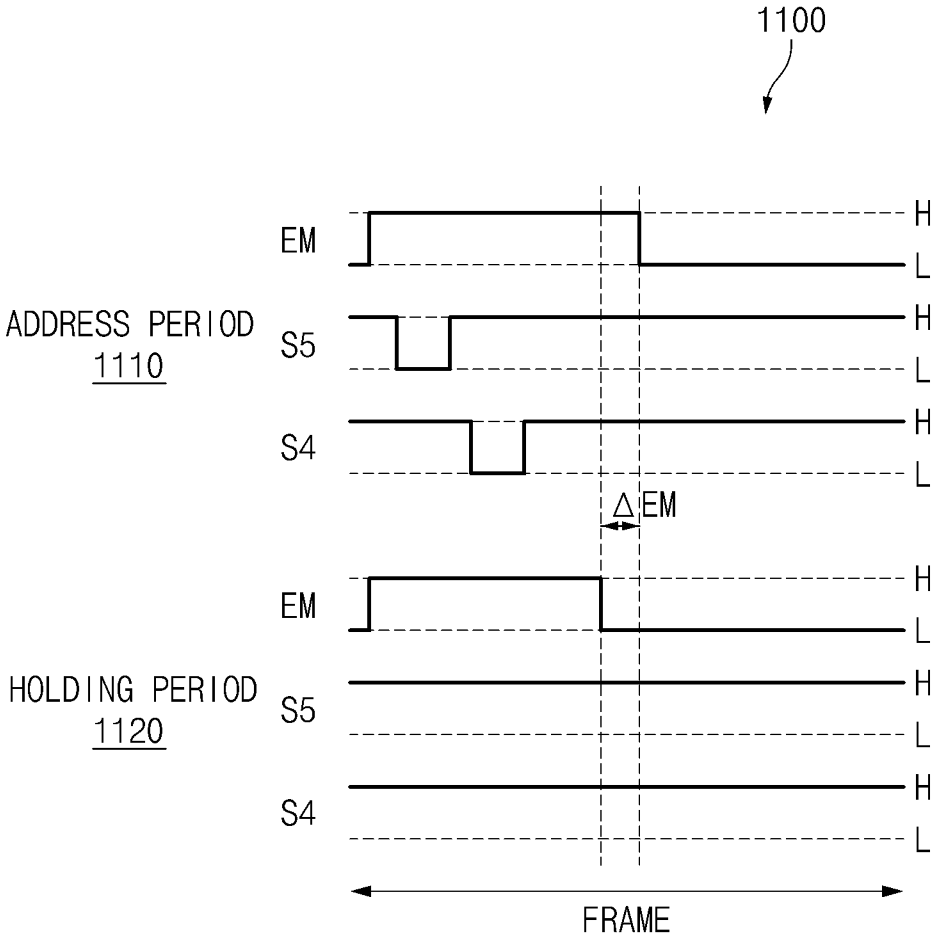
FIG. 11 is a graph illustrating a fourth scan signal, a fifth scan signal, and an emission signal associated with a frame in an address period and a holding period according to an example embodiment.

FIG. 11 is a graph 1100 illustrating the fourth scan signal S4, the fifth scan signal S5, and the emission signal EM associated with a frame in an address period 1110 and a holding period 1120 according to an example embodiment.

In an example embodiment, in the address period 1110, the fourth scan signal S4 and the fifth scan signal S5 belonging to one frame may transition from the high state "H" to the low state "L". In the holding period 1120, the fourth scan signal S4 and the fifth scan signal S5 belonging to one frame may maintain the high state "H". In the holding period 1120, a light may be emitted by using the data voltage DATA stored in a previous frame. Emission luminance in the holding period 1120 may change due to a change in a driving characteristic of a driving transistor (e.g., the first transistor T1 of FIG. 5).

In an embodiment, in one frame, the emission signal EM may maintain the high state "H" during a time when a display (e.g., the display 210 of FIG. 2) is turned off and may maintain the low state "L" during a time when a pixel emits a light and a screen is displayed in the display (e.g., the display 210 of FIG. 2). A time when the emission signal EM is in the low state "L" may be a time when the display driving circuit 230 provides the emission signal EM.

In an embodiment, the display driving circuit 230 may control a provision time of the emission signal EM in the holding period 1120. The display driving circuit 230 may differently control the time (i.e., the provision time), during which the emission signal EM is provided within one frame, in the address period 1110 and the holding period 1120. The display driving circuit 230 may set a difference value ΔEM such that a luminance value difference of the address period 1110 and the holding period 1120 is compensated for.

In an example embodiment, a luminance change in the holding period 1120 may be compensated for by adjusting an emission on width of the emission signal EM. In the holding period 1120, voltage compensation for driving transistor T1 may not be performed separately. With regard to a fifth transistor (e.g., the fifth transistor T5 of FIG. 5) and a sixth transistor (e.g., the sixth transistor T6 of FIG. 5) controlling a pixel based on the emission signal EM, the display driving circuit 230 may adjust a ratio at which the emission signal EM maintains the low state "L".

In an example embodiment, to compensate for a luminance change in the holding period 1120, the display driving circuit 230 may adjust an emission signal (EM) width being a time during which the emission signal EM maintains the low state "L". When luminance in the holding period 1120 is lower than luminance in the address period 1110, the display driving circuit 230 may increase the emission signal width being a time during the emission signal EM is continuous in the holding period 1120. When the luminance in the holding period 1120 is higher than the luminance in the address period 1110, the display driving circuit 230 may decrease the emission signal width.

In an embodiment, the display driving circuit 230 may store a provision ratio of the emission signal EM according to luminance of the display 210 in a memory (e.g., the memory 233 of FIG. 2). The display driving circuit 230 may change a time during which the emission signal EM is in the low state "L" in the holding period 1120, based on luminance and/or an on pixel ratio (OPR) of the display 210.

In an example embodiment, to compensate for the emission signal EM in the holding period 1120, the display driving circuit 230 may use a look up table (LUT) stored in the memory 233. For the accurate compensation, there is a need to apply an on ratio of the emission signal EM stored for each luminance. A compensation look up table may refer to data that include an on offset of the emission signal EM or a ratio, at which the emission signal EM maintains the low state "L" within a frame, for each current luminance of the display 210 and/or for each on pixel ratio of the display 210. For example, Table 2 below shows the compensation look up table.

TABLE 2

| Brightness level (%) | Emission signal on offset value | Ratio (%) of turned-on pixels | Emission signal on offset |
|---|---|---|---|
| 80% ≤ maximum brightness value | First offset value | 80% ≤ maximum brightness value | First offset value |
| 70% ≤ maximum brightness value < 80% | Second offset value | 70% ≤ maximum brightness value < 80% | Second offset value |
| 60% ≤ maximum brightness value < 70% | Third offset value | 60% ≤ maximum brightness value < 70% | Third offset value |
| 40% ≤ maximum brightness value < 60% | Fourth offset value | 40% ≤ maximum brightness value < 60% | Fourth offset value |
| 20% ≤ maximum brightness value < 40% | Fifth offset value | 20% ≤ maximum brightness value < 40% | Fifth offset value |
| 10% ≤ maximum brightness value < 20% | Sixth offset value | 10% ≤ maximum brightness value < 20% | Sixth offset value |
| Maximum brightness value < 10% | Seventh offset value | Maximum brightness value < 10% | Seventh offset value |

In an example embodiment, in the holding period, the display driving circuit 230 may adjust the on ratio of the emission signal EM for each frame. Even in the holding period of each frame, the display driving circuit 230 may differently set a time, during which the emission signal EM is continuously maintained in the low state "L", based on a driving environment in the holding period. For example, Table 3 below shows a duration ratio of the low state "L" of the emission signal EM for each frame.

TABLE 3

| Period | Address | Holding | Holding | Holding | Holding |
|---|---|---|---|---|---|
| Emission signal on ratio | 10.0% | 9.50% | 9.60% | 9.70% | 9.70% |

In an example embodiment, the display driving circuit 230 may differently set an offset value for setting the emission signal EM to "On", for each frame and depending on a cycle in a frame. For example, Table 4 below shows an offset value for setting a duration ratio of the low state "L" of the emission signal EM for each cycle of each frame.

TABLE 4

| Name | Description |
|---|---|
| First offset value | Emission signal on value of 1/4 cycle of first frame |
| Second offset value | Emission signal on value of 2/4 cycle of first frame |
| Third offset value | Emission signal on value of 3/4 cycle of first frame |
| Fourth offset value | Emission signal on value of 4/4 cycle of first frame |
| Fifth offset value | Emission signal on value of 1/2 cycle of second frame |
| Sixth offset value | Emission signal on value of 2/2 cycle of second frame |
| Seventh offset value | Emission signal on value of 1 cycle of third frame |
| Eighth offset value | Emission signal on value of 2 cycles of fourth frame |

In an example embodiment, the display driving circuit 230 may be driven in the address period continuously at the transition time point of the driving frequency. When the driving frequency transitions from a high frequency to a low frequency, due to the hysteresis of the driving transistor T1, a charge amount of a storage capacitor (e.g., the storage capacitor Cst of FIG. 5) in one frame may be smaller than a specified charge amount. The display driving circuit 230 may set a plurality of frames to the address period continuously at the transition time point of the driving frequency.

In an example embodiment, the display driving circuit 230 may adjust the on ratio of the emission signal EM in the address period continuously set at the time when the driving frequency changes. To charge the storage capacitor Cst before the low-frequency driving, about 3 to 4 frames should be output at 60 Hz at the time when the low-frequency (e.g., about 1 Hz) driving starts after the driving is made at about 60 Hz. The display driving circuit 230 may adjust the on ratio of the emission signal EM such that the change in the driving frequency is not visually perceived and thus compensate for the change in luminance capable of occurring during the charging of the storage capacitor Cst. For example, Table 5 below a duration ratio of the low state "L" of the emission signal EM for each frame.

TABLE 5

| Step | Ad-dress | Ad-dress | Ad-dress | Ad-dress | Hold-ing | Hold-ing | Hold-ing | Hold-ing |
|---|---|---|---|---|---|---|---|---|
| On ratio | 10.0% | 9.90% | 9.80% | 9.70% | 9.50% | 9.40% | 9.30% | 9.20% |

Figure 12:
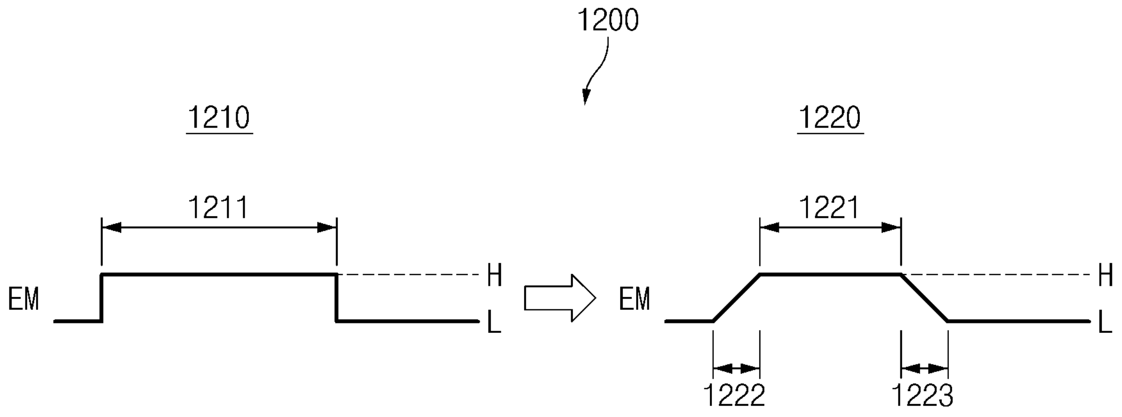
FIG. 12 is a diagram illustrating an emission signal according to an example embodiment.

FIG. 12 is a diagram 1200 illustrating the emission signal EM according to an example embodiment.

In an example embodiment, like a first situation 1210, the emission signal EM may be in the high state "H" during a specified period 1211 in a first frame and may be in the low state "L" during the remaining period other than the specified period 1211.

In an example embodiment, like a second situation 1220, the display driving circuit 230 may gradually change the emission signal EM. To adjust the on time of the emission signal EM more finely, the display driving circuit 230 may gradually change the emission signal EM. In the second situation 1220, the emission signal EM may have a rising period 1222, in which the emission signal EM gradually increases from the low state "L" to the high state "H", before a high state (H) period 1221. In the second situation 1220, the emission signal EM may have a falling period 1223, in which the emission signal EM gradually decreases from the high state "H" to the low state "L", after the high state (H) period 1221.

In an example embodiment, the display driving circuit 230 may adjust a slope of the on period of the emission signal EM. The display driving circuit 230 may adjust an on/off time of a fifth transistor (e.g., the fifth transistor T5 of FIG. 5) and a sixth transistor (e.g., the sixth transistor T6 of FIG. 5) constituting a pixel more finely. The display driving circuit 230 may perform finer luminance compensation in the holding period.

In an example embodiment, the display driving circuit 230 may adjust the slop of the on period by changing a width (or a time) of the rising period 1222 and/or the falling period 1223. For example, the display driving circuit 230 may adjust the widths of the rising period 1222 and the falling period 1223 to be identical or similar to each other or to be different from each other. For example, the display driving circuit 230 may change the on period of the emission signal EM by adjusting the widths of the rising period 1222 and the falling period 1223 to be identical or similar to each other. As another example, the display driving circuit 230 may change the on period of the emission signal EM by adjusting a slope of the rising period 1222 so as to be set to a first slope and adjusting a slope of the falling period 1223 so as to be set to a second slope different from the first slope.

According to an example embodiment, an electronic device (e.g., the electronic device 101 of FIG. 1) may include a housing, a display (e.g., the display 210 of FIG. 2) that is viewable through at least a portion of the housing and displays a screen by using a plurality of pixels, a display driving circuit (e.g., the display driver IC 230 of FIG. 2) that provides the display with a data voltage and an emission signal for driving each of the plurality of pixels, and a processor (e.g., the processor 120 of FIG. 1) that is operatively connected with the display and the display driving circuit. The processor may set a first frame that the display drives. The display driving circuit may set a first period in which the data voltage is supplied to a first transistor of each of the plurality of pixels and a second period in which the data voltage written in the first period is maintained and may change an initialization voltage to be supplied to the plurality of pixels in the second period.

For example, each of the plurality of pixels may include a second transistor (e.g., T2 of FIG. 3) and a third transistor (e.g., T3 of FIG. 3) that supply a data voltage to a storage capacitor through a first transistor (e.g., T1 of FIG. 3) based on a first scan signal of the first frame, a fourth transistor (e.g., T4 of FIG. 3) that initializes the data voltage to a first initialization voltage, and a seventh transistor (e.g., T7 of FIG. 3) that initializes a voltage across a light-emitting element of each of the plurality of pixels to a second initialization voltage different from the first initialization voltage, based on a third scan signal of a second frame being a next frame of the first frame.

For example, the first transistor may include a driving transistor, the first period may include an address period, and the second period may include a holding period.

According to an example embodiment, the display driving circuit may drive the third transistor and the fourth transistor respectively based on a fourth scan signal and a fifth scan signal being separate scan signals.

For example, the first scan signal and the second scan signal may transition from a high state to a low state in the first period and the second period, and the fourth scan signal and the fifth scan signal may transition from the high state to the low state in the first period and may maintain the high state in the second period.

For example, each of the plurality of pixels may be connected with a first initialization line supplying the first initialization voltage and a second initialization line supplying a second initialization voltage. The display driving circuit may vary the second initialization voltage in the second period.

For example, the display driving circuit may decrease a potential of the second initialization voltage when a screen that the display displays in the second period is brighter than a screen that the display displays in the first period.

According to an example embodiment, the display driving circuit may maintain the data voltage in a state of being biased with a DC voltage having a specified magnitude in the second period.

According to an example embodiment, an electronic device (e.g., the electronic device 101 of FIG. 1) may include a housing, a display (e.g., the display 210 of FIG. 2) that is viewable through at least a portion of the housing and displays a screen by using a plurality of pixels, a display driving circuit (e.g., the display driver IC 230 of FIG. 2) that provides the display with a data voltage and an emission signal for driving each of the plurality of pixels, and a processor (e.g., the processor 120 of FIG. 1) that is operatively connected with the display and the display driving circuit. The processor may set a frame that the display drives. The display driving circuit may set a first period in which the data voltage is supplied to a first transistor of each of the plurality of pixels and a second period in which the data voltage written in the first period is maintained and may control a time during which the emission signal is provided in the second period.

For example, each of the plurality of pixels may include a second transistor supplying a data voltage to the first transistor based on a first scan signal of the frame, a third transistor maintaining the data voltage supplied to the first transistor during the frame, a fourth transistor initializing the data voltage to a first initialization voltage, a fifth transistor supplying a high-potential reference voltage to a source electrode of the first transistor based on an emission signal in the frame, and a sixth transistor supplying a driving current to a light-emitting element of each of the plurality of pixels based on the emission signal in the frame. For example, the third transistor and the fourth transistor may be oxide thin film transistors.

According to an embodiment, the display driving circuit may drive the third transistor and the fourth transistor respectively based on a fourth scan signal and a fifth scan signal being separate scan signals.

For example, the first scan signal and the second scan signal may transition from a high state to a low state in the first period and the second period, and the fourth scan signal and the fifth scan signal may transition from the high state to the low state in the first period and may maintain the high state in the second period.

According to an embodiment, the display driving circuit may increase an emission signal width being a time during which the emission signal is provided in the second period, when luminance in the second period is lower than luminance in the first period.

According to an embodiment, the display driving circuit may adjust an on ratio of the emission signal in the second period for each frame.

According to an embodiment, a method for driving a display of an electronic device (e.g., the electronic device 101 of FIG. 1) may include setting a first frame that the display drives, setting a first period in which a data voltage for driving a plurality of pixels constituting the display is supplied to a first transistor corresponding to the plurality of pixels and a second period in which the data voltage written in the first period is maintained, and changing an initialization voltage to be supplied to the plurality of pixels in the second period of the first frame.

For example, each of the plurality of pixels may be connected with a first initialization line supplying a first initialization voltage and a second initialization line supplying a second initialization voltage. The changing of the initialization voltage may include varying the second initialization voltage in the second period.

For example, the first transistor may include a driving transistor, the first period may address period, and the second period may include a holding period.

The method may further include maintaining the data voltage in a state of being biased with a DC voltage having a specified magnitude in the second period.

For example, each of the plurality of pixels may include a second transistor supplying a data voltage to the first transistor based on a first scan signal of the first frame, a third transistor maintaining the data voltage supplied to the first transistor during the first frame, a fourth transistor initializing the data voltage to a first initialization voltage, and a seventh transistor initializing a voltage across a light-emitting element corresponding to the plurality of pixels to a second initialization voltage based on a third scan signal of a second frame being a next frame of the first frame. The method may further include driving the third transistor and the fourth transistor respectively based on a fourth scan signal and a fifth scan signal.

For example, the first transistor may include a driving transistor, and the first period and the second period may include an address period and a holding period, respectively.

According to an embodiment, the method may further include decreasing a potential of the second initialization voltage when a screen that the display displays in a second holding period is brighter than a screen that the display displays in a first address period.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C" may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:

a housing;

a display configured to display a screen via a plurality of pixels;

a display driving circuit configured to provide the display with a data voltage and an emission signal for driving each of the plurality of pixels, wherein each of the plurality of pixels is electrically connected with a first initialization line and a second initialization line; and a processor operatively connected with the display driving circuit, wherein the processor is configured to set a first frame that the display drives, and wherein the display driving circuit is configured to:

set a first period in which the data voltage is supplied to a first transistor of each of the plurality of pixels and a second period in which the data voltage written in the first period is maintained;

supply a first voltage to the first initialization line in the first period and the second period; and supply a second voltage to the second initialization line in the first period and supply a third voltage different from the second voltage to the second initialization line in the second period.

2. The electronic device of claim 1, wherein each of the plurality of pixels includes:

a second transistor and a third transistor configured to supply the data voltage to a storage capacitor through the first transistor based on at least a first scan signal of the first frame;

a fourth transistor configured to initialize the data voltage to the first voltage; and a seventh transistor configured to initialize a voltage across a light-emitting element of each of the plurality of pixels to the second voltage different from the first voltage, based on at least a third scan signal of a second frame being a next frame of the first frame.

3. The electronic device of claim 2, wherein the display driving circuit is configured to drive the third transistor and the fourth transistor respectively based at least on a fourth scan signal and a fifth scan signal being separate scan signals.

4. The electronic device of claim 3, wherein the first scan signal and the third scan signal are configured to transition from a high state to a low state in the first period and the second period, and wherein the fourth scan signal and the fifth scan signal are configured to transition from the high state to the low state in the first period and to maintain the high state in the second period.

5. The electronic device of claim 1, wherein the first transistor includes a driving transistor, wherein the first period includes an address period, and wherein the second period includes a holding period.

6. The electronic device of claim 1, wherein the display driving circuit is configured to:

decrease a potential of the third voltage when a screen that the display displays in the second period is brighter than a screen that the display displays in the first period.

7. The electronic device of claim 1, wherein the display driving circuit is configured to maintain the data voltage in a state of being biased with a DC voltage having a specified magnitude in the second period.

8. An electronic device comprising:

a housing;

a display configured to display a screen via a plurality of pixels, wherein each of the plurality of pixels is electrically connected with a first initialization line and a second initialization line;

a display driving circuit configured to provide the display with a data voltage and an emission signal for driving each of the plurality of pixels; and a processor operatively connected with the display driving circuit, wherein the processor is configured to set a frame that the display drives, and wherein the display driving circuit is configured to:

set a first period in which the data voltage is supplied to a first transistor of each of the plurality of pixels and a second period in which the data voltage written in the first period is maintained;

supply a first voltage to the first initialization line in the first period and the second period;

supply a second voltage to the second initialization line in the first period and supply a third voltage different from the second voltage to the second initialization line in the second period; and control a time during which the emission signal is provided in the second period.

9. The electronic device of claim 8, wherein each of the plurality of pixels includes:

a second transistor configured to supply the data voltage to the first transistor based at least on a first scan signal of the frame;

a third transistor configured to maintain the data voltage supplied to the first transistor during the frame;

a fourth transistor configured to initialize the data voltage to the first voltage;

a fifth transistor configured to supply a high-potential reference voltage to a source electrode of the first transistor based at least on the emission signal in the frame;

a sixth transistor configured to supply a driving current to a light-emitting element of each of the plurality of pixels based on the emission signal in the frame; and a seventh transistor configured to initialize a voltage across a light-emitting element of each of the plurality of pixels to the second voltage different from the first voltage, based on at least a third scan signal of a second frame being a next frame of the first frame.

10. The electronic device of claim 9, wherein the third transistor and the fourth transistor each comprise an oxide thin.

11. The electronic device of claim 9, wherein the display driving circuit is configured to drive the third transistor and the fourth transistor respectively based at least on a fourth scan signal and a fifth scan signal being separate scan signals.

12. The electronic device of claim 11, wherein the first scan signal and a third scan signal are configured to transition from a high state to a low state in the first period and the second period, and wherein the fourth scan signal and the fifth scan signal are configured to transition from the high state to the low state in the first period and to maintain the high state in the second period.

13. The electronic device of claim 8, wherein the display driving circuit is configured to:

increase an emission signal width being a time during which the emission signal is provided in the second period, when luminance in the second period is lower than luminance in the first period.

14. The electronic device of claim 8, wherein the display driving circuit is configured to adjust an on ratio of the emission signal in the second period for each frame.

* * * * *